United States Patent
Obrecht et al.

(10) Patent No.: US 7,470,750 B2
(45) Date of Patent: *Dec. 30, 2008

(54) METHOD FOR THE DEGRADATION OF NITRILE RUBBER BY METATHESIS IN THE PRESENCE OF RUTHENIUM- OR OSMIUM-BASED CATALYSTS

(75) Inventors: Werner Obrecht, Moers (DE); Julia Maria Müller, Blaustein (DE); Oskar Nuyken, München (DE); Heinz Berke, Salenstein (CH); Ludek Meca, Zürich (CH); Lubica Triscikova, Zürich (CH)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/509,983

(22) Filed: Aug. 25, 2006

(65) Prior Publication Data
US 2007/0049700 A1  Mar. 1, 2007

(30) Foreign Application Priority Data

Aug. 30, 2005  (DE) ............ 10 2005 040 939
Oct. 8, 2005   (DE) ............ 10 2005 048 327
Dec. 9, 2005   (DE) ............ 10 2005 058 834

(51) Int. Cl.
*C08F 20/44* (2006.01)
*C08F 8/04*  (2006.01)
*C08F 8/50*  (2006.01)
*C08C 19/02* (2006.01)
*C08C 19/08* (2006.01)

(52) U.S. Cl. ........... 525/329.3; 525/329.1; 525/338; 525/370; 526/341; 526/342

(58) Field of Classification Search ......... 525/329.1, 525/329.3, 338, 370; 526/341, 342
See application file for complete search history.

(56) References Cited

U.S. PATENT DOCUMENTS

| | | | |
|---|---|---|---|
| 3,700,637 A | 10/1972 | Finch, Jr. et al. | 260/83.3 |
| 4,464,515 A | 8/1984 | Rempel et al. | 525/338 |
| 4,503,196 A | 3/1985 | Rempel et al. | 525/338 |
| 4,581,417 A | 4/1986 | Buding et al. | 525/338 |
| 4,631,315 A | 12/1986 | Buding et al. | 525/338 |
| 4,746,707 A | 5/1988 | Fiedler et al. | 525/338 |
| 4,795,788 A | 1/1989 | Himmler et al. | 525/338 |
| 4,978,771 A | 12/1990 | Fiedler et al. | 558/459 |
| 6,683,136 B2 | 1/2004 | Guo et al. | 525/329.3 |
| 2004/0110888 A1 | 6/2004 | Guerin et al. | 524/492 |
| 2004/0127647 A1 | 7/2004 | Ong et al. | 525/191 |
| 2004/0132891 A1 | 7/2004 | Ong et al. | 524/492 |
| 2004/0132906 A1 | 7/2004 | Guerin et al. | 525/63 |
| 2005/0121158 A1 | 6/2005 | Bokström et al. | 162/24 |
| 2007/0208206 A1* | 9/2007 | Obrecht et al. | 585/645 |

FOREIGN PATENT DOCUMENTS

| | | |
|---|---|---|
| DE | 25 39 132 | 3/1977 |
| EP | 298 386 | 1/1989 |
| EP | 471 250 | 2/1992 |
| WO | 96/04289 | 2/1996 |
| WO | 97/06185 | 2/1997 |
| WO | 00/71554 | 11/2000 |
| WO | 02/100905 | 12/2002 |
| WO | 02/100941 | 12/2002 |
| WO | 03/002613 | 1/2003 |

OTHER PUBLICATIONS

Romero et al., Angew. Chem. Int. Ed. 43 (2004) 6161-6165.*
Angew. Chem. Int. Ed. 2004, 43, 6161-6165, Patricio E. Romero, Warren E. Piers, and Robert McDonald,"Rapidly Initiating Ruthenium Olefin-Metathesis Catalysts".

* cited by examiner

*Primary Examiner*—Roberto Rábago
(74) *Attorney, Agent, or Firm*—Jennifer R. Seng

(57) ABSTRACT

A novel process for the degradation of nitrile rubber by metathesis using ruthenium- or osmium-based catalysts which have both a substituted or unsubstituted imidazolidine ligand and a carbene ligand bearing a phosphonium radical is provided.

14 Claims, No Drawings

METHOD FOR THE DEGRADATION OF NITRILE RUBBER BY METATHESIS IN THE PRESENCE OF RUTHENIUM- OR OSMIUM-BASED CATALYSTS

FIELD OF THE INVENTION

The present invention relates to a novel process for the degradation of nitrile rubber by metathesis using ruthenium- or osmium-based catalysts.

BACKGROUND OF THE INVENTION

Hydrogenated nitrile rubber, also referred to as "HNBR" for short, is produced by hydrogenation of nitrile rubber, also referred to as "NBR" for short.

For the purposes of the present invention, the term nitrile rubber refers to rubbers which are copolymers of at least one unsaturated nitrile and at least one conjugated diene and possibly further comonomers.

Hydrogenated nitrile rubber is a specialty rubber which has very good heat resistance, outstanding resistance to ozone and chemicals and excellent oil resistance.

The abovementioned physical and chemical properties of HNBR are combined with very good mechanical properties, in particular a high abrasion resistance. For this reason, HNBR has found widespread use in a wide variety of applications. For example, HNBR is used for seals, hoses, belts and damping elements in the automobile sector, and also for stators, borehole extraction seals and valve seals in the field of oil and for numerous parts in the electrical industry, mechanical engineering and shipbuilding.

HNBR grades which are commercially available on the market usually have a Mooney viscosity (ML 1+4@100° C.) in the range from 55 to 105, which corresponds to a weight average molecular weight $M_w$, (determination method: gel permeation chromatography (GPC) using polystyrene standards) in the range from about 200 000 to 500 000. The polydispersity indices PDI (PDI=$M_w/M_n$, where $M_w$ is the weight average molecular weight and $M_n$ is the number average molecular weight) measured here, which give information about the width of the molecular weight distribution, are frequently 3 or above. The residual double bond content is usually in the range from 1 to 18% (determined by IR spectroscopy).

The relatively high Mooney viscosity greatly restricts the processibility of HNBR. For many applications, an HNBR grade which has a lower molecular weight and thus a lower Mooney viscosity would be desirable. This would significantly improve the processibility.

Numerous attempts have been made in the past to decrease the chain length of HNBR by degradation. This degradation has been carried out, for example, via a mechanical route by means of mastication, e.g. on a roll mill. Chemical degradation by reaction with strong acids is also possible in principle. However, this chemical degradation has the disadvantage that functional groups such as carboxylic acid and ester groups are incorporated into the molecule and, in addition, the microstructure of the polymer is changed substantially. All these changes result in disadvantages in use.

The production of HNBR having a low molar mass, corresponding to a Mooney viscosity (ML 1+4 at 100° C.) in the range below 55 or a number average molecular weight of $M_n$<200 000 g/mol, is not possible by means of established production methods since, firstly, a step increase in the Mooney viscosity occurs on hydrogenation of NBR and, secondly, the molar mass of the NBR feedstock to be used for the hydrogenation cannot be reduced at will since processing in the available industrial plants is otherwise no longer possible because of excessive stickiness. The lowest Mooney viscosity of an NBR feedstock which can be processed without difficulties in an established industrial plant is about 30 Mooney units (ML 1+4 at 100° C.). The Mooney viscosity of the hydrogenated nitrile rubber obtained using such an NBR feedstock is in the order of 55 Mooney units (ML1+4 at 100° C.).

In the known prior art, this problem is solved by reducing the molecular weight of the nitrile rubber prior to the hydrogenation by degradation to Mooney values (ML 1+4 at 100° C.) of less than 30 Mooney units or a number average molecular weight of $M_n$<70 000 g/mol. The decrease in the molecular weight is achieved here by metathesis, with low molecular weight 1-olefins usually being added in this metathesis reaction. The metathesis reaction is advantageously carried out in the same solvent as the hydrogenation reaction (in situ) so that the degraded NBR feedstock does not have to be isolated from the solvent after the degradation reaction is complete, before it is subjected to the subsequent hydrogenation. The metathetic degradation reaction is catalysed using metathesis catalysts which are tolerant towards polar groups, in particular towards nitrile groups.

The production of HNBR having low Mooney values is described, for example, in WO-A-02/100941 and WO-A-02/100905. WO-A-02/100905 describes a process which comprises the degradation of nitrile rubber starting polymers by olefin metathesis and subsequent hydrogenation. Here, a nitrile rubber is reacted in the presence of a coolefin and a specific catalyst based on an osmium, ruthenium, molybdenum or tungsten complex in a first step and hydrogenated in a second step. According to WO-A-02/100941, it is possible to obtain hydrogenated nitrile rubbers having a weight average molecular weight ($M_w$) in the range from 30 000 to 250 000, a Mooney viscosity (ML 1+4@100° C.) in the range from 3 to 50 and a polydispersity index PDI of less than 2.5 in this way.

Metathesis catalysts are known from, inter alia, WO-A-96/04289 and WO-A-97/06185. They have the following basic structure:

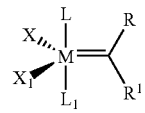

where M is osmium or ruthenium, R and $R^1$ are each organic radicals having a wide structural variability, X and $X_1$ are each anionic ligands and L and $L_1$ are each uncharged electron donors.

Such catalysts are suitable for ring-closing metatheses (RCMs), cross metatheses (CMs) and ring-opening metatheses (ROMPs). However, the catalysts mentioned are not necessarily suitable for carrying out the degradation of nitrile rubber.

The metathesis of nitrile rubber can be carried out successfully using some catalysts from the group of "Grubbs (I) catalysts". A suitable catalyst is, for example, a ruthenium catalyst having a particular pattern of substituents, e.g. the catalyst bis(tricyclohexylphosphine) benzylideneruthenium dichloride shown below.

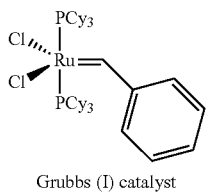

Grubbs (I) catalyst

After the hydrogenation, the rubbers have a very much lower molecular weight and a narrow molecular weight distribution (WO-A-02/100941, WO-A-03/002613).

US 2004/0110888 A1 discloses vulcanizates based on these low molecular weight HNBRs.

US 2004/0127647 A1 describes blends based on low molecular weight HNBRs having a bimodal or multimodal molecular weight distribution and also vulcanizates of these rubbers.

Furthermore, WO-A-00/71554 discloses a group of catalysts which are referred to in the art as "Grubbs (II) catalysts". If such a "Grubbs (II) catalyst", e.g. 1,3-bis(2,4,6-trimethylphenyl)-2-imidazolidenylidene)(tricyclohexylphosphine)ruthenium(phenylmethylene) dichloride, is used for the NBR metathesis, this succeeds even without the use of a coolefin. After the subsequent hydrogenation, which is carried out in situ, the hydrogenated nitrile rubber has a lower molecular weight and a narrower molecular weight distribution (PDI) than when catalysts of the Grubbs (I) type are used (US-A-2004/0132891).

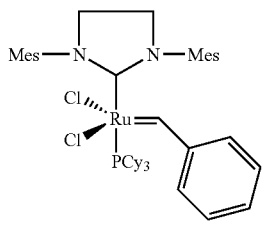

Grubbs (II) catalyst

The use of the nitrile rubbers which have been degraded using a Grubbs (II) catalyst for adhesive compositions is described, for example, in US 2004/0132906-A1.

The abovementioned processes for the degradation of nitrile rubber by metathesis and the catalysts used for this purpose have the disadvantage that solutions of these catalysts are unstable, especially in the presence of atmospheric oxygen, and always have to be made up fresh.

In addition, catalysts which will hereinafter be referred to as Piers (I) catalysts and have the following structure are also known in the art (cf., for example, Angew. Chem. Int. Ed. 2004, 43, 6161-6165):

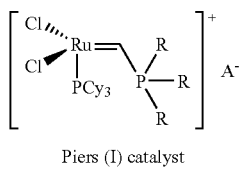

Piers (I) catalyst where R is, for example, an isopropyl or cyclohexyl radical and A is an anion.

However, our own studies have shown that such Piers (I) catalysts do not lead to degradation of the nitrile rubber in NBR metathesis but instead lead exclusively to gelling of the NBR. This makes the nitrile rubber unusable.

Furthermore, WO-A-2005/121158 describes catalysts for metathesis reactions developed from the Piers (I) catalyst.

SUMMARY OF THE INVENTION

Starting out from the prior art, it is an object of the invention to provide a process for the degradation of nitrile rubbers by metathesis, which is carried out using a suitable catalyst and in which no gelling is observed and the catalyst also has improved storage stability in solution.

This object is surprisingly achieved by a process for the degradation of nitrile rubber by metathesis using catalysts which bear an imidazolidine ligand and at the same time a carbene ligand having a phosphine radical.

DETAILED DESCRIPTION OF THE INVENTION

The invention accordingly provides a process for the degradation of nitrile rubbers by metathesis, comprising subjecting the nitrile rubber to a metathesis reaction in the presence of a catalyst of the general formula (I),

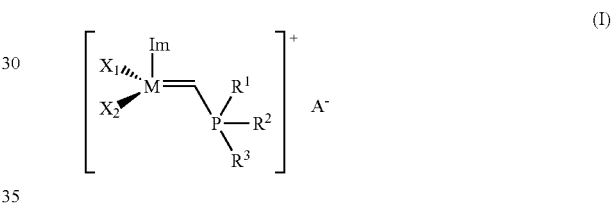

wherein
M is ruthenium or osmium,
$X^1$ and $X^2$ can be identical or different and are each anionic ligands,
$R^1$, $R^2$ and $R^3$ are identical or different and are each organic radicals,
Im is a substituted or unsubstituted imidazolidine radical and
A is an anion.

These catalysts of the general formula (I) having an imidazolidine ligand and also a carbene ligand which has a phosphine radical can be successfully used for the degradation by metathesis, i.e. a degradation of the nitrile rubber is achieved without gelling being observed. This is all the more astonishing since the above-described Piers (I) catalysts were found to be unsuitable for use in the degradation of nitrile rubbers by metathesis. In addition, the catalysts according to the invention form a stable solution in the solvents typically used, in particular in chlorobenzene, even at elevated temperatures. Discolouration of catalyst solutions on prolonged standing or at elevated temperature, which usually indicates deactivation or decomposition, was not observed.

$X^1$ and $X^2$:

In the catalysts of the general formula (I), $X^1$ and $X^2$ can be identical or different and are each, for example, hydrogen, halogen, pseudohalogen, $C_1$-$C_{20}$-alkyl, aryl, $C_1$-$C_{20}$-alkoxy, aryloxy, $C_3$-$C_{20}$-alkyldiketonate, aryldiketonate, $C_1$-$C_{20}$-carboxylate, arylsulphonate, $C_1$-$C_{20}$-alkylsulphonate, $C_1$-$C_{20}$-alkylthiol, arylthiol, $C_1$-$C_{20}$-alkylsulphonyl or $C_1$-$C_{20}$-alkylsulphinyl radicals.

The abovementioned radicals as definitions of $X^1$ and $X^2$ can also be substituted by one or more further radicals, for example by halogen, preferably fluorine, $C_1$-$C_{10}$-alkyl, $C_1$-$C_{10}$-alkoxy or aryl radicals, where the latter radicals may in turn also be substituted by one or more substituents selected from the group consisting of halogen, preferably fluorine, $C_1$-$C_5$-alkyl, $C_1$-$C_5$-alkoxy and phenyl.

In a preferred embodiment, X and $X^1$ are each halogen, benzoate, $C_1$-$C_5$-carboxylate, $C_1$-$C_5$-alkyl, phenoxy, $C_1$-$C_5$-alkoxy, $C_1$-$C_5$-alkylthiol, arylthiol, aryl or $C_1$-$C_5$-alkylsulphonate. In a particularly preferred embodiment X and $X^1$ are both halogen, $CF_3COO$, $CH_3COO$, $CFH_2COO$, $(CH_3)_3CO$, $(CF_3)_2(CH_3)CO$, $(CF_3)(CH_3)_2CO$, PhO, MeO, EtO, tosylate, mesylate or trifluoromethanesulphonate. In particular, X and $X^1$ are both chlorine.

$P(R^1R^2R^3)$:

In the catalysts of the general formula (I), the radicals $R^1$, $R^2$ and $R^3$ in the radical $(R^1R^2R^3)$ are identical or different and can each be straight-chain or branched $C_1$-$C_{30}$-alkyl, $C_5$-$C_{30}$-cycloalkyl or aryl, where the $C_1$-$C_{30}$-alkyl radicals may be interrupted by one or more double or triple bonds or else one or more heteroatoms, preferably oxygen or nitrogen. Suitable radicals $P(R^1R^2R^3)$ for the catalysts of the general formula (I) are, for example, triphenylphosphine, tricyclohexylphoshine, tricyclopentylphosphine, triisopropylphosphine, tri(o-tolyl)phosphine, tri (o-xylyl)phosphine and trimesitylphosphine.

Im:

The imidazolidine radical (Im) in the general formula (I) usually has a structure of the general formula (IIa) or (IIb),

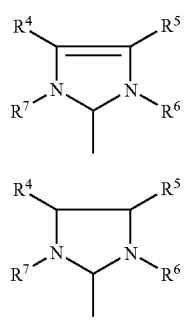

(IIa)

(IIb)

where $R^4$, $R^5$, $R^6$, $R^7$ can be identical or different and are each hydrogen, straight-chain or branched, cyclic or acyclic $C_1$-$C_{20}$-alkyl, $C_2$-$C_{20}$-alkenyl, $C_2$-$C_{20}$-alkynyl, aryl, $C_1$-$C_{20}$-carboxylate, $C_1$-$C_{20}$-alkoxy, $C_2$-$C_{20}$-alkenyloxy, $C_2$-$C_{20}$-alkynyloxy, aryloxy, $C_2$-$C_{20}$-alkoxycarbonyl, $C_1$-$C_{20}$-alkylthio, arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

One or more of the radicals $R^4$, $R^5$, $R^6$, $R^7$ may independently be substituted by one or more substituents, preferably straight-chain or branched, cyclic or acyclic $C_1$-$C_{10}$-alkyl, $C_1$-$C_{10}$-alkoxy or aryl, where these abovementioned substituents may in turn be substituted by one or more radicals, preferably radicals selected from the group consisting of halogen, $C_1$-$C_5$-alkyl, $C_1$-$C_5$-alkoxy and phenyl.

In a preferred embodiment, the process of the invention is carried out using catalysts of the general formula (I) in which $R^4$ and $R^5$ are each, independently of one another, hydrogen, aryl, particularly preferably phenyl, straight-chain or branched $C_1$-$C_{10}$-alkyl, particularly preferably propyl or butyl, or together form a cycloalkyl or aryl radical, where all the abovementioned radicals may in turn be substituted by one or more further radicals selected from the group comprising straight-chain or branched $C_1$-$C_{10}$-alkyl, $C_1$-$C_{10}$-alkoxy, aryl and a functional group selected from the group of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the process of the invention, use is made of catalysts of the general formula (I) in which the radicals $R^6$ and $R^7$ are identical or different and are each straight-chain or branched $C_1$-$C_{10}$-alkyl, particularly preferably i-propyl or neopentyl, aryl, particularly preferably phenyl, $C_1$-$C_{10}$-alkylsulphonate, particularly preferably methanesulphonate, or $C_6$-$C_{10}$-arylsulphonate, particularly preferably p-toluenesulphonate. The abovementioned radicals $R^6$ and $R^7$ may be substituted by one or more further radicals selected from the group comprising straight-chain or branched $C_1$-$C_5$-alkyl, in particular methyl, $C_1$-$C_5$-alkoxy, aryl and a functional group selected from the group of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen. Particular preference is given to the radicals $R^6$ and $R^7$ being identical or different and each being i-propyl, neopentyl or adamantyl.

The process of the invention is particularly preferably carried out using catalysts of the general formula (I) containing imidazolidine radicals (Im) having the following structures (IIIa-f):

(IIIa)

(IIIb)

(IIIc)

(IIId)

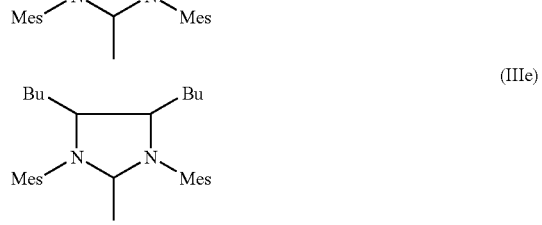

(IIIe)

-continued

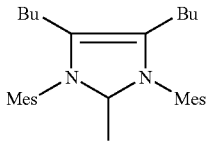
(IIIf)

A:

In the general formula (I), A is an anion, preferably selected from the group of the halides, the pseudohalides, the carboxylates, the sulphonates, the sulphates, the phosphonates, the phosphates, the complex anions and from the group of the noncoordinating anions.

A can also be, for example, nitrate, nitrite, carbonate, sulphite, fluorosulphonate or trifluoromethanesulphonate (triflate).

A halide A can be fluoride, chloride, bromide or iodide.

A pseudohalide A can be, for example, cyanide, thiocyanate, azide, cyanurate or thiocyanurate.

A carboxylate A can be, for example, formate, acetate, sebacate, versatate, abietate, benzoate, trichloroacetate, trifluoroacetate, maleate or salicylate.

A sulphonate A can be, for example, dodecylsulphonate, trifluoromethylsulphonate, benzenesulphonate or naphthalenesulphonate.

A sulphate A can be, for example, methylsulphate, propylsulphate or dodecylsulphate.

A phosphonate A can be, for example, monoethylphosphonate, dilaurylphosphonate or diphenylphosphonate.

A phosphate A can be, for example monoethylphosphate, dilaurylphosphate, monophenylphosphate or diphenylphosphate.

A can also be a complex anion such as perchlorate, tetrafluoroborate, tetrafluoroaluminate, hexafluorophosphate, hexafluoroarsenate, hexafluoroantimonate or hexachloroantimonate.

A can also be a noncoordinating anion such as tetrakis[pentafluorophenyl]borate, pentakis-[pentafluorophenyl]phosphate, tetrakis[3,5-trifluoromethylphenyl]borate, pentakis[3,5-trifluoromethylphenyl]phosphate, pentakis[pentafluorophenyl]cyclohexadienyl anion or (bis(trispentafluorophenyl)boro)cyanide.

In a particularly preferred embodiment of the process of the invention, catalysts having the following structures (IVa-c):

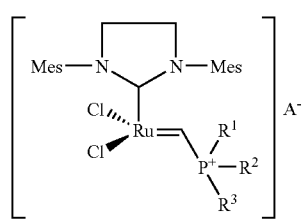
(IVa)

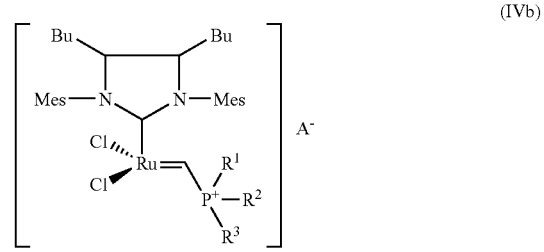
(IVb)

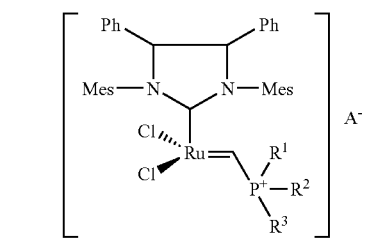
(IVc)

where
$R^1$, $R^2$, $R^3$ are each straight-chain or branched $C_1$-$C_{30}$-alkyl, $C_5$-$C_{10}$-cycloalkyl or aryl, where the $C_1$-$C_{30}$-alkyl radicals may be interrupted by one or more double or triple bonds or else one or more heteroatoms, preferably oxygen or nitrogen, and
A is as defined for the general formula (I)
are used.

In a very particularly preferred embodiment of the process of the invention, use is made of catalysts of the general formulae (IVa-c)

in which
the radical $P(R^1R^2R^3)$ is triisopropylphosphine, triphenylphosphine, tricyclohexylphoshine, tricyclopentylphosphine, tri(o-tolyl)phosphine, tri(o-xylyl)phosphine or trimesitylphosphine and
A is bromide, versatate, sebacate, trifluoroacetate, nitrate, tetrafluoroborate, tetrakis(3,5-trifluoromethylphenyl)borate, tetrakis[pentafluoro-phenyl]borate or (bis(trispentafluorophenyl)boro)cyanide.

An excellent metathetic degradation of nitrile rubber can be effected in the presence of these catalysts of the general formula (I).

Reaction Conditions in the Metathesis:

In the process of the invention, the amount of the catalyst of the general formula (I) used for the metathesis depends on the nature and catalytic activity of the specific catalyst. The amount of catalyst used, based on the nitrile rubber used, is from 5 to 1 000 ppm of noble metal, preferably 10-500 ppm, in particular 25-250 ppm.

The NBR metathesis is usually carried out in the presence of a coolefin, preferably a straight-chain or branched $C_2$-$C_{16}$-olefin. Examples of suitable coolefins are ethylene, propylene, isobutene, styrene, 1-hexene and 1-octene. Preference is given to using 1-hexene or 1-octene. If this coolefin is liquid (for example 1-hexene), the amount of coolefin is preferably in the range 0.2-20% by weight based on the NBR used. If the coolefin is a gas, for example ethylene, the amount of coolefin is selected so that a pressure in the range $1\times10^5$ Pa-$1\times10^7$ Pa, preferably a pressure in the range from $5.2\times10^5$ Pa to $4\times10^6$ Pa, is established in the reaction vessel.

The metathesis reaction can be carried out in a suitable solvent which does not deactivate the catalyst used and does not adversely affect the reaction in any other way. Preferred solvents include, but are not restricted to, dichloromethane, benzene, toluene, methyl ethyl ketone, acetone, tetrahydrofuran, tetrahydropyran, dioxane and cyclohexane. The particularly preferred solvent is chlorobenzene. In some cases when the cycloolefin can itself function as solvent, e.g. in the case of 1-hexene, the addition of a further additional solvent can be dispensed with.

The concentration of the nitrile rubber used in the reaction mixture for the metathesis is not critical, but it naturally has to be taken into account that the reaction should not be adversely affected by a much too high viscosity of the reaction mixture and the associated mixing problems. The concentration of the NBR in the reaction mixture is preferably in the range from 1 to 20% by weight, particularly preferably in the range from 5 to 15% by weight, based on the total reaction mixture.

The degradation by metathesis is usually carried out at a temperature in the range from 20° C. to 150° C., preferably in the range from 30 to 100° C., in particular in the range from 50 to 90° C.

The reaction time depends on a number of factors, for example on the type of NBR, on the type of catalyst, on the catalyst concentration used and on the reaction temperature. The reaction is typically complete within three hours under normal conditions. The progress of the metathesis can be monitored by standard analytical methods, e.g. by GPC or by determination of the viscosity.

Nitrile Rubbers:

As nitrite rubbers ("NBR"), it is possible to use polymers which comprise repeating units of at least one conjugated diene, at least one α,β-unsaturated nitrite and, if desired, one or more further copolymerizable monomers in the metathesis reaction of the invention.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Special preference is given to 1,3-butadiene or isoprene or mixtures thereof. Very particular preference is given to 1,3-butadiene.

As α,β-unsaturated nitrite, it is possible to use any known α,β-unsaturated nitrite, preferably ($C_3$-$C_5$) α,β-unsaturated nitriles such as acrylonitrile, methacrylonitrile, ethacrylonitrile or mixtures thereof. Particular preference is given to acrylonitrile.

A particularly preferred nitrite rubber is thus a copolymer of acrylonitrile and 1,3-butadiene.

In addition, it is possible to use further monomers known to those skilled in the art, e.g. α,β-unsaturated carboxylic acids or their esters. Preference is given to fumaric acid, maleic acid, acrylic acid, methacrylic acid and itaconic acid as acids and to their esters butyl acrylate, butyl methacrylate, ethylhexyl acrylate and ethylhexyl methacrylate. Other monomers which can be used are unsaturated dicarboxylic acids or derivatives thereof, for example esters or amides, e.g. diethyl maleate, monoethyl maleate and maleimide. Preference is given to methacrylic acid, fumaric acid, butyl acrylate and 2-ethylhexyl acrylate.

The proportions of conjugated diene and α,β-unsaturated nitrite in the NBR polymers to be used can vary within a wide range. The proportion of the conjugated diene or of the sum of the conjugated dienes is usually in the range from 40 to 90% by weight and preferably in the range from 65 to 75% by weight, based on the total polymer. The proportion of the α,β-unsaturated nitrile or of the sum of the α,β-unsaturated nitriles is usually from 10.0 to 60% by weight, preferably from 25 to 35% by weight, based on the total polymer. The additional monomers can be present in amounts of from 0.1 to 40% by weight, preferably from 1 to 30% by weight, based on the total polymer. If this is the case, the proportions of the α,β-unsaturated nitriles and of the conjugated dienes are reduced correspondingly and the proportions of all monomers in each case add up to 100% by weight.

The preparation of nitrile rubbers by polymerization of the abovementioned monomers is adequately known to those skilled in the art and is comprehensively described in the literature (e.g. Houben-Weyl, Methoden der Organischen Chemie Vol. 14/1, Georg Thieme Verlag Stuttgart 1961).

The nitrile rubbers used for the metathesis have a Mooney viscosity (ML 1+4@100° C.) in the range from 30 to 70, preferably from 30 to 50. This corresponds to a weight average molecular weight $M_w$ in the range 200 000-500 000, preferably in the range 200 000-400 000. Furthermore, the nitrile rubbers used have a polydispersity PDI=$M_w/M_n$, where $M_n$ is the number average molecular weight, in the range 2.0-6.0, preferably in the range 2.0-4.0.

The determination of the Mooney viscosity is carried out in accordance with ASTM standard D 1646.

Degraded Nitrile Rubbers:

The nitrile rubbers obtained by the metathesis process of the invention have a Mooney viscosity (ML 1+4@100° C.) in the range 5-30, preferably 5-20. This corresponds to a weight average molecular weight $M_w$ in the range 10 000-200 000, preferably in the range 10 000-150 000. Furthermore, the nitrile rubbers obtained have a polydispersity PDI=$M_w/M_n$, where $M_n$ is the number average molecular weight, in the range 1.5-4.0, preferably in the range 1.7-3.

Hydrogenation:

The process of the invention for degradation by metathesis can be followed by a hydrogenation of the degraded nitrile rubbers obtained. This can be carried out in a manner known to those skilled in the art.

It is possible to carry out the hydrogenation using homogeneous or heterogeneous hydrogenation catalysts. It is also possible to carry out the hydrogenation in situ, i.e. in the same reaction vessel in which the degradation by metathesis has previously also been carried out and without the necessity of isolating the degraded nitrile rubber. The hydrogenation catalyst is simply added to the reaction vessel.

The reaction with hydrogen can appropriately be carried out, for example, using homogeneous catalysts such as that known as the "Wilkinson" catalyst (($PPh_3)_3RhCl$) and tetrakis(triphenylphosphine)rhodium hydride or others.

Processes for the hydrogenation of nitrile rubber are known. Rhodium, ruthenium or titanium are usually used as catalysts, but platinum, iridium, palladium, rhenium, ruthenium, osmium, cobalt or copper can also be used, either as metal or else preferably in the form of metal compounds (cf., for example, U.S. Pat. No. 3,700,637, DE-A-2 539 132, EP-A-0 134 023, DE-A-35 41 689, DE-A-35 40 918, EP-A-0 298 386, DE-A-35 29 252, DE-A-34 33 392, U.S. Pat. Nos. 4,464, 515 and 4,503,196).

Suitable catalysts and solvents for a hydrogenation in the homogeneous phase are described below and are also known from DE-A-25 39 132 and EP-A-0 471 250.

The selective hydrogenation can, for example, be achieved in the presence of a rhodium- or ruthenium-containing catalyst. For example, it is possible to use a catalyst of the general formula

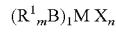

where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, 1 is 2, 3 or 4, m is 2 or 3 and n is 1, 2 or 3, preferably 1 or 3. Preferred catalysts are tris(triphenylphosphine) rhodium(I) chloride, tris(triphenylphosphine)rhodium(III) chloride and tris(dim-ethyl-sulphoxide)rhodium(III) chloride and also tetrakis (triphenylphosphine)rhodium hydride of the formula $((C_6H_5)_3)_4RhH$ and the corresponding compounds in which all or part of the triphenylphosphine has been replaced by tricyclohexylphosphine. The catalyst can be used in small amounts. An amount in the range 0.01-1% by weight, preferably in the range 0.03-0.5% by weight and particularly preferably in the range 0.1-0.3% by weight, based on the weight of the polymer, is suitable.

It is usually advantageous to use the catalyst together with a cocatalyst which is a ligand of the formula $R^1{}_mB$, where $R^1$, m and B are as defined above. m is preferably 3, B is preferably phosphorus and the radicals $R^1$ can be identical or different. Preferred cocatalysts have trialkyl, tricycloalkyl, triaryl, triaralkyl, diarylmonoalkyl, diarylmonocycloalkyl, dialkylmonoaryl, dialkylmonocycloalkyl or dicycloalkyl-monoaryl radicals.

Examples of cocatalysts may be found, for example, in U.S. Pat. No. 4,631,315. A preferred cocatalyst is triphenylphosphine. The cocatalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is advantageous to use from 0.1 to 33 parts by weight of the cocatalyst, preferably from 0.5 to 20 parts by weight and very particularly preferably from 1 to 5 parts by weight, in particular more than 2 but less than 5 parts by weight of cocatalyst based on 100 parts by weight of the nitrile rubber to be hydrogenated.

The industrial procedure for carrying out this hydrogenation will be adequately known to those skilled in the art from U.S. Pat. No. 6,683,136. It is usually carried out by treating the nitrile rubber to be hydrogenated in a solvent such as toluene or monochlorobenzene with hydrogen at 100-150° C. and a pressure of 50-150 bar for 2-10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium and supported on, for example, carbon, silica, calcium oxide, barium sulphate, etc.

After the hydrogenation is complete, a hydrogenated nitrile rubber having a Mooney viscosity (ML 1+4@100° C.), measured in accordance with ASTM standard D 1646, in the range 10-50, preferably 10-30, is obtained. This corresponds to a weight average molecular weight $M_w$ in the range 20 000-400 000 g/mol, preferably in the range 20 000-200 000 g/mol. Furthermore, the hydrogenated nitrile rubbers obtained have a polydispersity $PDI=M_w/M_n$, where $M_n$ is the number average molecular weight, in the range 1-5 and preferably in the range 1.5-3.

EXAMPLES

I Synthesis of Catalysts used According to the Invention

[dichloro(1,3-dimesityldihydroimidazolylidene)(tricyclohexylphosphoniocarb-ene)ruthenium]tetrafluoroborate (2) in B2;

[dichloro(1,3-dimesityldihydroimidazolylidene)(tricyclohexylphosphoniocarb-ene)ruthenium][tetrakis(3,5-trifluoromethylphenyl)borate] (3) in B3

[dichloro(4,5-dibutyl-1,3-dimesityldihydroimidazolylidene) (tricyclohexylphos-phoniocarbene)ruthenium]tetrafluoroborate (6) in B8

B1 Carbido(dichloro)-1,3-dimesityldihydroimidazolylidene(tricyclohexylphosphine) ruthenium (1)

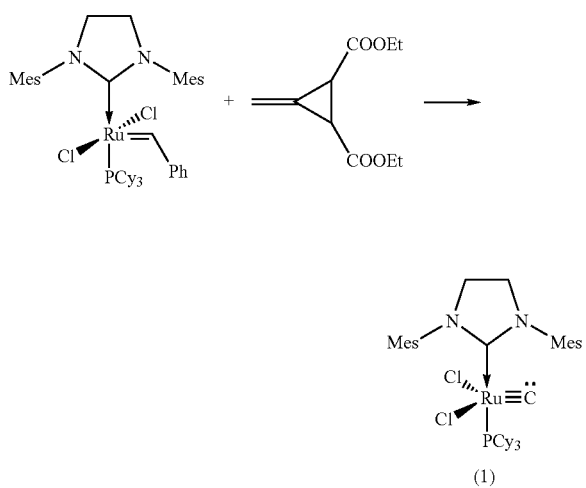

(1)

(1,3-Dimesityldihydroimidazolylidene)(PCy₃) Cl₂Ru=CHPh (0.42 g; 0.5 mmol) and diethyl trans-3-methylene-1,2-cyclopropanedicarboxylate (0.10 g; 0.5 mmol) were placed in a 25 ml Schlenk vessel. Under nitrogen as protective gas, dry CH₂Cl₂ (5 ml) was added and the reddish brown solution was stirred for 12 hours. The solvent was then taken off from the resulting orange-brown solution in a high vacuum. Under nitrogen, the brown residue was taken up in hexane (2 ml), stirred for 1 hour and then filtered. Washing the residue twice with hexane gave carbido(dichloro)-1,3-dimesityldihydroimidazolylidene(tricyclohexyl-phosphine) ruthenium (1) as a light-brown solid (0.23 g; 60%).

¹H NMR (300 MHz, CDCl₃): δ 6.95 (s, 2H), 6.89 (s, 2H), 4.07 (m, 4H), 2.53 (s, 6H), 2.49 (s, 6H), 2.31 (broad s, 3H), 2.29 (s, 3H), 2.24 (s, 3H), 1.88, 1.62, 1.13 (all m, 30 H). ³¹P NMR (121 MHz, CDCl₃): δ 34.7 (s).

B2 [Dichloro(1,3-dimesityldihydroimidazolylidene)(tricyclohexylphosphoniocarbene)ruthenium]tetrafluoroborate (2)

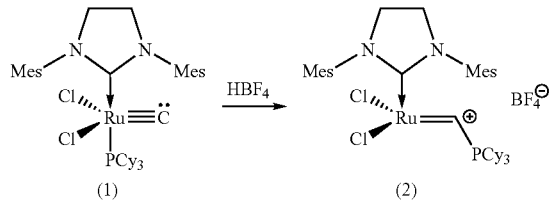

All glass apparatuses were dried at 160° C. in an oven.

Compound (1) from Example B1 (0.15 g; 0.195 mmol) was placed in a 25 ml Schlenk vessel under nitrogen as protective gas. 10 ml of dry $CH_2Cl_2$ were condensed in under reduced pressure and the reaction mixture was then warmed to room temperature. $[H(Et_2O)_2]BF_4$ (0.027 ml; 0.195 mmol) was added by means of a syringe, whereupon the colour of the solution changed to greenish brown. The mixture was stirred for 2 hours and the solvent was then taken off in an oil-pump vacuum. The oily residue was extracted with 2 ml of hexane under nitrogen for 1 hour and filtered. After washing with hexane twice more, [dichloro(1,3-dimesityldihydroimidazolylidene)tricyclohexylphosphoniocarbene)ruthenium]tetrafluoro-borate (2) was obtained as a greenish brown microcrystalline solid (0.15 g; 90%).

$^1$H NMR (300 MHz, $CD_2Cl_2$): δ 17.86 (d, J=36 Hz, 1H), 7.11 (s, 4H), 4.21 (s, 4H), 2.40 (s, 6H), 2.38 (s, 12H), 2.34 (broad s, 3H), 1.82, 1.25 (all m, 30 H). $^{31}$P NMR (121 MHz, $CDCl_3$): δ 54.4.

$^{13}$C NMR (125 MHz, $CD_2Cl_2$): δ 262.8 (Ru=CH—), 188.5 (N—C—N), 141.4 ($C_{Mes}$), 138.3 ($C_{Mes}$), 135.0 ($C_{Mes}$), 130.6 ($C_{Mes}$H), 53.1 (N—$CH_2$), 30.7 (d, $J_{C-P}$=37 Hz), 28.2, 26.5 (d, $J_{C-P}$=12 Hz), 25.3 (all $PCy_3$), 21.3 (para-$CH_3$), 19.1 (ortho-$CH_3$).

B3 [Dichloro(1,3-dimesityldihydroimidazolylidene)(tricyclohexylphosphoniocarbene)ruthenium][tetrakis(3,5-trifluoromethylphenyl)borate] (3)

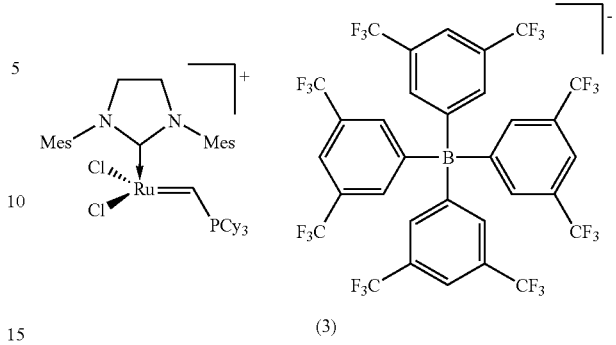

All glass apparatuses were dried at 160° C. in an oven.

Compound 1 from Example B1 (0.231 g; 0.3 mmol) and $[H(Et_2O)_2][B[3,5-(CF_3)_2C_6H_3]_4]$ (0.304 ml; 0.3 mmol) were placed in a 25 ml Schlenk vessel. Dry $CH_2Cl_2$ (15 ml) was condensed in under reduced pressure and the mixture was then warmed to room temperature. After stirring for 2 hours, the solvent was taken off in an oil-pump vacuum. The oil which remained was extracted with hexane under nitrogen for 1 hour and the supernatant solvent was decanted off. Washing with hexane was repeated once. [Dichloro(1,3-dimesityldihydroimidazolylidene)(tricyclohexylphosphoniocarbene)ruthenium][tetrakis(3,5-trifluoromethylphenyl)borate] (3) was obtained as a greenish brown solid (0.46 g; 94%).

$^1$H NMR (300 MHz, $CD_2Cl_2$): δ 18.08 (d, J=38 Hz, 1H), 7.72 (m, 8H), 7.56 (s, 4H), 7.07 (s, 4H), 4.15 (s, 4H), 2.37 (s, 18H), 2.33 (broad s, 3H), 1.80, 1.24 (all m, 30 H). $^{31}$P NMR (121 MHz, $CDCl_3$): δ53.6.

$^{13}$C NMR (125 MHz, $CD_2Cl_2$): δ 261.6 (Ru=CH—), 188.5 (N—C—N), 162.1 (1:1:1:1 q, $J_{C-B}$=50 Hz, $C_{Ph}$—B), 140.8 ($C_{Mes}$), 138.3 ($C_{Mes}$), 135.1 (ortho-$C_{Ph}$H), 134.9 ($C_{Mes}$), 130.8 ($C_{Mes}$H), 129.2 (q, $J_{C-F}$=32 Hz, C—$CF_3$), 124.9 (q, $J_{C-F}$=272 Hz, $CF_3$), 117.8 (para-$C_{Ph}$H), 53.4 (N—$CH_2$), 30.6 (d, $J_{C-P}$=38 Hz), 28.2, 26.5 (d, $J_{C-P}$=11 Hz), 25.2 (all $PCy_3$), 21.3 (para-$CH_3$), 19.1 (ortho-$CH_3$).

Theoretical contents for $C_{72}H_{72}BCl_2F_{24}N_2PRu$: C: 52.89%, H: 4.44%, N: 1.71%

Determined by analysis: C: 52.92%, H: 4.35%, N: 1.73%.

MS: m/e (%) 770 (1), 733 (2), 304 (43), 214 (100), 198 (59), 133 (77), 117 (55), 83 (51), 55 (62).

B4: dl-N,N'-Dimesityldecane-5,6-diamine

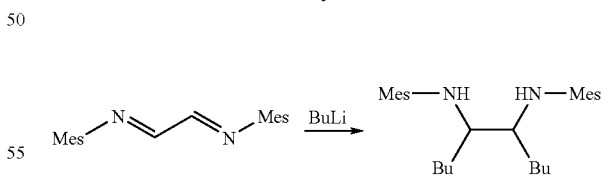

In a 150 ml Schlenk vessel, N,N'-dimesitylethanediimine (2.92 g; 10 mmol) was dissolved in 30 ml of THF under nitrogen as protective gas and the solution was cooled to −78° C. 1.6 M Butyllithium in hexane (13.8 ml; 22 mmol) was then slowly added to the resulting suspension at −78 ° C. The reaction mixture was warmed to −10° C. over a period of one hour and was stirred at this temperature for a further hour. The solvent was then taken off and 15 ml of diethyl ether and 10 ml of water were then added on an ice bath. The aqueous layer was extracted with 2×5 ml of ether and the combined extracts were dried over powdered NaOH. Taking off the solvent left an orange oil. The crude product was chromatographed on a silica gel column (50 g) and eluted with petroleum ether/toluene (1:1). Taking off the solvent gave yellow crystals of dl-N,N'-dimesityldecane-5,6-diamine (2.67 g; 65%).

$^1$H NMR (300 MHz, CDCl$_3$): δ 6.74 (s, 4H), 3.12 (broad s, 2H), 2.98 (broad s, 2H), 2.22 (s, 6H), 2.05 (s, 12H), 1.74 (m, 2H), 1.49 (m, 2H), 1.30 (m, 8H), 0.89 (t, J=6.8 Hz, 6H). $^{13}$C NMR (75 MHz, CDCl$_3$): δ 141.9, 130.2, 129.6, 128.8, 58.0, 31.1, 29.5, 23.1, 20.5, 18.8, 14.1.

Theoretical contents for C$_{28}$H$_{44}$N$_2$: C: 82.29%, H: 10.85%, N: 6.85%

Determined by analysis: C: 82.20%, H: 10.66%, N: 6.91%

MS: m/e (%): 408 (1), 333 (3), 204 (100), 146 (85), 44 (92)

B5: [trans-4,5-Dibutyl-1,3-dimesityl-4,5-dihydroimidazolium]tetrafluoroborate

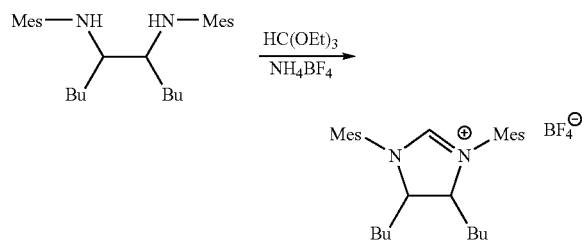

dl-N,N'-Dimesityldecane-5,6-diamine from Example B3 (0.817 g; 2 mmol), NH$_4$BF$_4$ (0.21 g; 2 mmol) and triethyl orthoformate (0.42 ml; 2.5 mmol) were placed in a 25 ml round-bottom flask. The reaction mixture was heated to 130° C. for 4 hours under a continual stream of nitrogen. Taking off the solvent gave a brown oil which was stirred with 2 ml of diethyl ether for 1 hour. The diethyl ether was decanted off and the washing operation with diethyl ether was repeated twice. This gave dark crystals as crude product, and these were subject to column chromatography on silica gel (15 g). Elution with methyl acetate and removal of the solvent gave the dihydroimidazolium salt as a light-brown powder (0.72 g; 71%).

$^1$H NMR (300 MHz, CDCl$_3$): δ 8.50 (s, 1H), 7.00 (s, 2H), 6.98 (s, 2H), 4.20 (broad s, 2H), 2.35 (s, 6H), 2.33 (s, 6H), 2.31 (s, 6H), 1.80 (m, 4H), 1.31 (m, 8H), 1.14 (m, 2H), 0.86 (t, J=6.9 Hz, 6H). $^{13}$C NMR (75 MHz, CDCl$_3$): δ 158.4, 140.4, 135.7, 134.4, 130.4, 128.9, 69.4, 32.9, 27.2, 22.3, 21.1, 18.4, 18.1, 13.7. MS: m/e (%): 419 (22), 361 (100), 305 (12), 280 (10), 146 (11), 135 (32), 57 (11).

B6: Dichloro(trans-4,5-dibutyl-1,3-dimesityldihydroimidazolylidene)(tricyclohexyl-phosphine)(phenylcarbene)ruthenium (4)

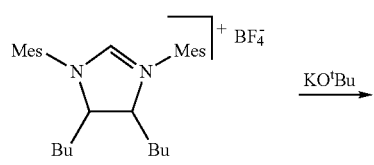

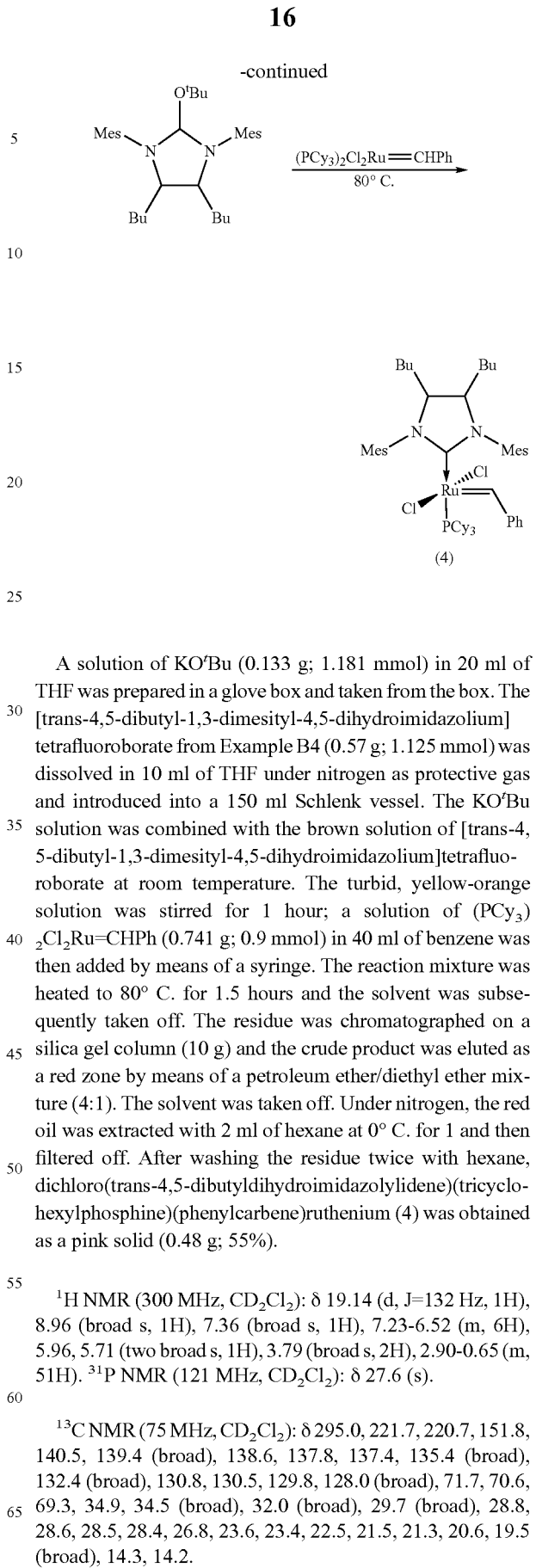

A solution of KO$^t$Bu (0.133 g; 1.181 mmol) in 20 ml of THF was prepared in a glove box and taken from the box. The [trans-4,5-dibutyl-1,3-dimesityl-4,5-dihydroimidazolium] tetrafluoroborate from Example B4 (0.57 g; 1.125 mmol) was dissolved in 10 ml of THF under nitrogen as protective gas and introduced into a 150 ml Schlenk vessel. The KO$^t$Bu solution was combined with the brown solution of [trans-4,5-dibutyl-1,3-dimesityl-4,5-dihydroimidazolium]tetrafluoroborate at room temperature. The turbid, yellow-orange solution was stirred for 1 hour; a solution of (PCy$_3$)$_2$Cl$_2$Ru=CHPh (0.741 g; 0.9 mmol) in 40 ml of benzene was then added by means of a syringe. The reaction mixture was heated to 80° C. for 1.5 hours and the solvent was subsequently taken off. The residue was chromatographed on a silica gel column (10 g) and the crude product was eluted as a red zone by means of a petroleum ether/diethyl ether mixture (4:1). The solvent was taken off. Under nitrogen, the red oil was extracted with 2 ml of hexane at 0° C. for 1 and then filtered off. After washing the residue twice with hexane, dichloro(trans-4,5-dibutyldihydroimidazolylidene)(tricyclohexylphosphine)(phenylcarbene)ruthenium (4) was obtained as a pink solid (0.48 g; 55%).

$^1$H NMR (300 MHz, CD$_2$Cl$_2$): δ 19.14 (d, J=132 Hz, 1H), 8.96 (broad s, 1H), 7.36 (broad s, 1H), 7.23-6.52 (m, 6H), 5.96, 5.71 (two broad s, 1H), 3.79 (broad s, 2H), 2.90-0.65 (m, 51H). $^{31}$P NMR (121 MHz, CD$_2$Cl$_2$): δ 27.6 (s).

$^{13}$C NMR (75 MHz, CD$_2$Cl$_2$): δ 295.0, 221.7, 220.7, 151.8, 140.5, 139.4 (broad), 138.6, 137.8, 137.4, 135.4 (broad), 132.4 (broad), 130.8, 130.5, 129.8, 128.0 (broad), 71.7, 70.6, 69.3, 34.9, 34.5 (broad), 32.0 (broad), 29.7 (broad), 28.8, 28.6, 28.5, 28.4, 26.8, 23.6, 23.4, 22.5, 21.5, 21.3, 20.6, 19.5 (broad), 14.3, 14.2.

B7: Carbido(dichloro)(trans-4,5-dibutyl-1,3-dimesityldihydroimidazolylidene) (tricyclohexylphosphine) ruthenium (5)

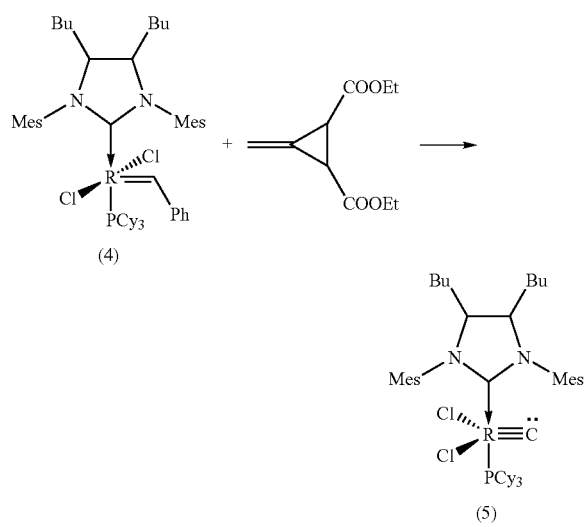

Dichloro(trans-4,5-dibutyldihydroimidazolylidene)(tricyclohexylphosphine)(phenylcarbene)ruthenium from Example B5 (0.48 g; 0.5 mmol) and diethyl trans-3-methylene-1,2-cyclopropanedicarboxylate (0.10 g; 0.5 mmol) were introduced into a 25 ml Schlenk vessel. 5 ml of dry $CH_2Cl_2$ were added under nitrogen as protective gas. The reddish brown solution obtained was stirred for 12 hours. The solvent was then taken off from the brown solution in a high vacuum. The oily residue was treated with 2 ml of hexane under nitrogen for 1 hour. After filtration, the solid was washed twice with hexane, giving carbido(dichloro)(4,5- dibutyl-1,3-dimesityldihydroimidazolylidene)(tricyclohexylphosphine)ruthenium (5) as a light-brown solid (0.35 g; 79%).

$^1$H NMR (300 MHz, $CDCl_3$): δ 6.90 (pseudo t, J=12 Hz, 4H), 3.91 (m, 1H), 3.79 (m, 1H), 2.53 (s, 3H), 2.51 (s, 3H), 2.50 (s, 3H), 2.48 (s, 3H), 2.31 (broad s, 3H), 2.28 (s, 3H), 2.24 (s, 3H), 1.98-1.48, 1.40-0.94 (all m, 42 H), 0.85 (t, J=6.9 Hz, 3H), 0.83 (t, J=6.9 Hz, 3H). $^{31}$P NMR (121 MHz, $CDCl_3$): δ 34.0 (s).

$^{13}$C NMR (75 MHz, $CDCl_3$): δ 480.8, 211.5, 210.3, 139.5, 139.1, 137.5, 137.4, 137.3, 136.8, 134.8, 129.8, 129.7, 129.5, 129.2, 70.5, 69.1, 34.4, 34.0, 31.2, 30.9, 29.2, 29.0, 27.9, 27.8, 27.7, 26.3, 22.7, 22.6, 21.6, 21.1, 20.9, 20.6, 20.2, 19.0, 13.8, 13.7.

Theoretical contents for $C_{48}H_{75}Cl_2N_2PRu$: C: 65.29%, H: 8.56%, N: 3.17%

Determined by analysis: C: 65.21%, H: 8.48%, N: 3.13%

MS: m/e (%) 882 (19), 846 (39), 602 (13), 429 (23), 417 (54), 315 (100), 198 (57), 117 (82), 55 (70).

Theoretical contents for $C_{54}H_{81}Cl_2N_2PRu$: C: 67.48%, H: 8.49%, N: 2.91%

Determined by analysis: C: 67.29%, H: 8.30%, N: 2.95%.

B8 [Dichloro(trans-4,5-dibutyl-1,3-dimesityldihydroimidazolylidene)(tricyclohexyl-phosphoniocarbene)]tetrafluoroborate (6)

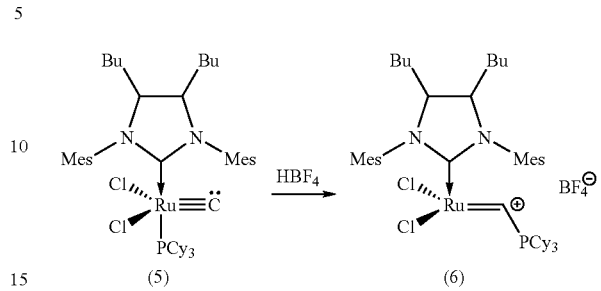

All glass apparatuses were dried at 160° C. in an oven.

Carbido(dichloro)(4,5-dibutyl-1,3-dimesityldihydroimidazolylidene)(tricyclohexylphosphine)ruthenium (5) from Example B6 (0.31 g; 0.35 mmol) was placed in a 25 ml Schlenk vessel and 10 ml of dry $CH_2Cl_2$ were condensed in under reduced pressure and the mixture was warmed to room temperature under nitrogen. [H(Et$_2$O)$_2$]BF$_4$ (0.048 ml; 0.35 mmol) was added by means of a syringe, whereupon the reaction mixture became greenish black. After stirring for 2 hours, the solvent was taken off in an oil-pump vacuum. The oily residue was treated with 2 ml of hexane under nitrogen for 1 hour and then filtered off. The washing procedure was repeated once, giving dichloro(trans-4,5-dibutyl-1,3-dimesityldihydroimidazolylidene)(tricyclohexylphosphoniocarbene)ruthenium]tetrafluoroborate (6) as a dark green microcrystalline solid (0.32 g; 94%).

$^1$H NMR (300 MHz, $CD_2Cl_2$): δ 19.83, 19.11, 18.44 (all s, 1H), 7.66-6.90 (m, 4H), 4.84 (m, 1H), 3.72 (m, 1H), 2.80-2.18, 2.00-0.62 (both m, 51H). $^{31}$P NMR (121 MHz, $CDCl_3$): δ 34.0 (s).

$^{13}$C NMR (75 MHz, $CDCl_3$): δ 194.8, 143.4 (broad), 139.0 (broad), 137.7, 136.8, 135.9, 135.2, 134.9, 134.0, 130.9, 129.8, 128.7, 121.7, 68.1, 66.0 (broad), 32.9, 30.9, 30.3, 28.6, 27.1, 27.0, 26.9, 26.7, 25.8, 23.1, 22.9, 21.6, 20.6, 20.2, 14.2, 14.1.

Theoretical contents for $C_{48}H_{76}BCl_2F_4N_2PRu$: C: 59.38%, H: 7.89%, N: 2.89%

Determined by analysis: C: 59.01%, H: 7.68%, N: 2.75%

II Stability of the Catalyst from Example B3 [dichloro(1,3-dimesityldihydro-imidazolylidene)(tricyclohexylphosphoniocarbene)ruthenium][tetrakis(3,5-trifluoro-methylphenyl)borate](ruthenium compound 3 from Example B3) Compared to 1,3-bis (2,4,6-trimethylphenyl)-2-imidazolidenylidene)(tricyclo-hexylphosphine)ruthenium(phenylmethylene)dichloride("Grubbs (II) catalyst") in Solution.

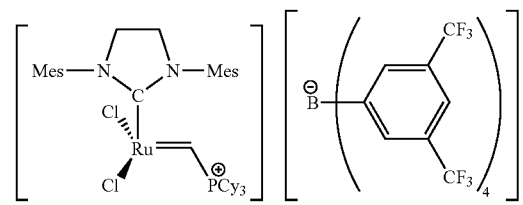

Ruthenium compound 3 from Example B3

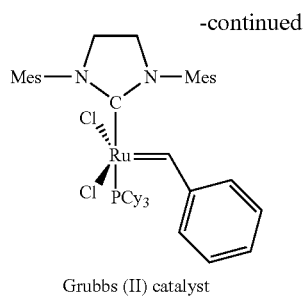

Grubbs (II) catalyst

The stability of the dissolved catalysts was determined by means of NMR in deuterochloroform ($CDCl_3$) and in deuterobenzene ($C_6D_6$).

Here, [dichloro(1,3-dimesityldihydroimidazolylidene)(tricyclohexylphosphoniocarbene)-ruthenium][tetrakis(3,5-trifluoromethylphenyl)borate]ruthenium compound according to the invention from Example B3) was examined in comparison with 1,3-bis(2,4,6-trimethyl-phenyl)-2-imidazolidenylidene)(tricyclohexylphosphine)ruthenium(phenyl-methylene) dichloride (Grubbs (II) catalyst). The Grubbs (II) catalyst was purchased from Materia Inc. (Pasadena Calif./USA). 0.01 molar solutions (4.2 mg of Grubbs (II) catalyst per 0.5 ml of solvent and 8.2 mg of catalyst from B3 per 0.5 ml of solvent) were used in each case. The solutions were prepared in air without protective gas. NMR tubes were filled with the solutions and stored at 24° C. At intervals of 30 minutes in each case, the NMR tubes were opened in air and shaken vigorously. The concentration determinations were carried out every hour.

In deuterochloroform, the following time dependences of the relative concentrations were determined:

|  | Time [h] | | | | |
| --- | --- | --- | --- | --- | --- |
|  | 0 | 1 | 2 | 3 | 4 |
| Grubbs (II) catalyst (not according to the invention) | 100 | 93.5 | 82.2 | 71.9 | 62.9 |
| Catalyst from Example B3 | 100 | 100 | 100 | 100 | 100 |

During the time for which the catalyst solutions were stored, the colour of the Grubbs (II) catalyst changed from violet to orange-brown. Benzaldehyde was formed as the decomposition product of the Grubbs (II) catalyst. The solution of the catalyst from B3 was initially orange. During the time for which the solution was stored, the colour became darker to a barely perceptible degree. Decomposition products of the catalyst from B3 could not be detected by means of NMR.

In deuterobenzene, the following time dependences of the relative concentrations were determined:

|  | Time [h] | | | | |
| --- | --- | --- | --- | --- | --- |
|  | 0 | 1 | 2 | 3 | 4 |
| Grubbs (II) catalyst (not according to the invention) | 100 | 83.6 | 73.6 | 66.8 | 59.9 |
| Catalyst from Example B3 | 100 | 100 | 100 | 100 | 100 |

During the time for which the catalyst solutions were stored, the colour of the Grubbs (II) catalyst changed from violet to dark-brown. Benzaldehyde was formed as the decomposition product of the Grubbs (II) catalyst. The solution of the catalyst from B3 was initially light green. No colour change was observed during the time for which the solution of the catalyst from B3 was stored. Decomposition products of the catalyst from B3 could not be detected by means of NMR.

The studies show that the catalyst from B3 [dichloro(1,3-dimesityldihydro-imidazolylidene)(tricyclohexylphosphoniocarbene)ruthenium][tetrakis(3,5-trifluoro-methylphenyl)borate] has a significantly better stability in oxygen-containing solvents than corresponding solutions of the Grubbs (II) catalyst.

III. Use of the Ru Catalysts from Examples B2, B3 and B8 for the Degradation of Nitrile Rubbers by Metathesis The degradation reactions described below were carried out using the nitrile rubber Perbunan® NT 3435 from Lanxess Deutschland GmbH. This nitrile rubber had the following characteristic properties:

| Acrylonitrile content: | 35% by weight |
| --- | --- |
| Mooney value (ML 1 + 4 @ 100° C.): | 34 Mooney units |
| Residual moisture content: | 1.8% by weight |
| $M_w$: | 240 000 g/mol |
| $M_n$: | 100 000 g/mol |
| PDI ($M_w/M_n$): | 2.4 |

This nitrile rubber will hereinafter be referred to as NBR for short.

For the degradation by metathesis, 293.3 g of chlorobenzene (hereinafter referred to as "MCB"/Aldrich) which had been distilled and saturated with oxygen at room temperature by passing air through it before use were used in each case. 40 g of NBR were dissolved therein at room temperature over a period of 10 hours. 0.8 g (2 phr) of 1-hexene was in each case added to the NBR-containing solution and the mixture was stirred for 30 minutes to homogenize it.

To carry out the metathesis reactions, the amounts indicated in the tables below of the above-described Ru catalysts from Examples B2, B3 and B7 were used. The Ru catalysts were for this purpose each dissolved in 20 g of MCB at room temperature without use of protective gas. Before the use of MCB for the preparation of the catalyst solutions, air was in each case passed through it at room temperature in order to saturated the solvent with oxygen. In trials 1) and 2), the addition of the catalyst solutions to the NBR solutions in MCB was carried out immediately after preparation of the catalyst solutions. In trial 3), the catalyst solution was stored at 40° C. for 4 days before use.

The reaction temperatures during the metathesis reactions are noted in the following tables. After the reaction times indicated in the tables, about 5 ml of solution were in each case taken from the reaction solutions and immediately admixed with about 0.2 ml of ethyl vinyl ether to stop the reaction and subsequently diluted with 5 ml of DMAc (N,N-dimethylacetamide) from Aldrich. 2 ml in each case of the solutions were introduced into a GPC vial and diluted to 3 ml with DMAc. Before carrying out the GPC analysis, the solutions were in each case filtered by means of a 0.2 µm syringe filter made of Teflon (Chromafil PTFE 0.2 µm; Machery-Nagel). The GPC analysis was subsequently carried out using an instrument from Waters (model 510). A combination of 4 columns from Polymer Laboratories was used for the analysis: 1) PLgel 5 μm Mixed-C, 300×7.5 mm, 2) PLgel 5 μm Mixed-C, 300×7.5 mm, 3) PLgel 3 μm Mixed-E, 300×7.5 mm, and 4) PLgel 3 μm Mixed-E, 300×7.5 mm.

The GPC columns were calibrated by means of linear poly(methyl methacrylate) from Polymer Standards Services. An RI detector from Waters (Waters 410) was used as detector. The analysis was carried out at a flow rate of 0.5 ml/min using DMAc as eluent. The GPC curves were evaluated using software from Millenium.

The following characteristic properties were determined by means of GPC analysis both for the original NBR rubber (before degradation) and for the degraded products:
$M_w$[kg/mol]: weight average molar mass
$M_n$[kg/mol]: number average molar mass
PDI: breadth of the molar mass distribution ($M_w/M_n$)

Three trials were carried out using the above-described Ru compounds B2, B3 and B8, and these trials show that these Ru compounds are suitable for catalysing the degradation of NBR:

Trial 1)

NBR Metathesis using [dichloro(1,3-dimesityldihydroimidazolylidene)-(tricyclohexylphosphoniocarbene)ruthenium]tetrafluoroborate (Ru Catalyst (2) from B2)

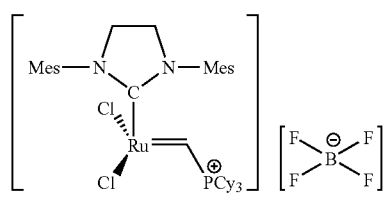
(2)

Trial 1) shows that the Ru catalyst (2) from Example B2 catalyses the metathetic degradation of NBR in an oxygen-saturated MCB solution at a reaction temperature of 55° C.

The degraded NBR obtained in trial 1) is gel-free.

Trial 2)

NBR metathesis using [dichloro(1,3-dimesityldihydroimidazolylidene)-(tricyclohexylphosphoniocarbene)ruthenium][tetrakis(3,5-trifluoromethylphenyl)-borate](Ru catalyst (3) from B3)

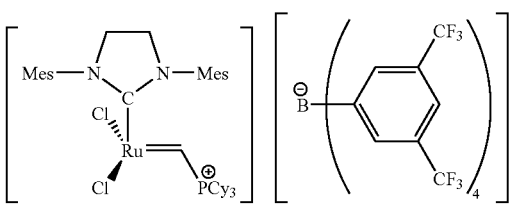
(3)

Tables 2a and 2b

| NBR | Ru catalyst (3) from B3 | | 1-Hexene | | Temperature |
|---|---|---|---|---|---|
| [g] | [mg] | [phr] | [g] | [phr] | [° C.] |
| 40 | 120 | 0.3 | 0.8 | 2.0 | 55 |

| | Reaction time at 55° C. [min.] | | | | |
|---|---|---|---|---|---|
| Analytical data | 0 | 30 | 60 | 185 | 425 |
| $M_w$ [kg/mol] | 240 | 98 | 81 | 54 | 48 |
| $M_n$ [kg/mol] | 100 | 48 | 42 | 31 | 26 |
| PDI | 2.4 | 2.0 | 1.9 | 1.7 | 1.8 |

Tables 1a and 1b

| NBR | Ru catalyst (2) from B2 | | 1-Hexene | | Temperature |
|---|---|---|---|---|---|
| [g] | [mg] | [phr] | [g] | [phr] | [° C.] |
| 40 | 120 | 0.3 | 0.8 | 2.0 | 1) 200 min at 23° C. 2) 425 min at 55° C. |

| | Reaction time at 55° C. [min.] | | | | |
|---|---|---|---|---|---|
| Analytical data | 0 | 30 | 60 | 185 | 425 |
| $M_w$ [kg/mol] | 240 | 181 | 195 | 192 | 58 |
| $M_n$ [kg/mol] | 100 | 79 | 83 | 82 | 22 |
| PDI | 2.4 | 2.3 | 2.3 | 2.3 | 2.6 |

Trial 2) shows that the Ru catalyst (3) from B3 catalyses the metathesis of NBR in an oxygen-saturated MCB solution at 55° C. The degraded NBR obtained in trial 2) is gel-free.

Trial 3)

NBR Metathesis using [dichloro(trans-4,5-dibutyl-1,3-dimesityldihydro-imidazolylidene)(tricyclohexylphosphoniocarbene)ruthenium]tetrafluoroborate (Ru Catalyst (6) from B8)

In this trial, the oxygen-containing MCB solution of the Ru catalyst (6) from B8 was stored at 40° C. for 4 days before use.

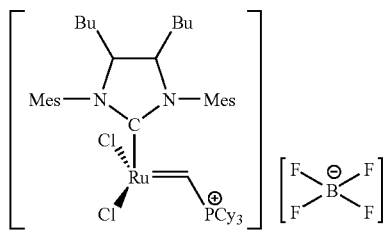

(6)

Tables 3a and 3b

| NBR | Ru catalyst (6) from B8 | | 1-Hexene | | Temperature |
|---|---|---|---|---|---|
| [g] | [mg] | [phr] | [g] | [phr] | [° C.] |
| 40 | 22.9 | 0.057 | 0.8 | 2.0 | 23° C. |

| | Reaction time at 23° C. [min.] | | | | |
|---|---|---|---|---|---|
| Analytical data | 0 | 30 | 60 | 185 | 425 |
| $M_w$ [kg/mol] | 240 | — | 178 | 159 | 161 |
| $M_n$ [kg/mol] | 100 | — | 66 | 67 | 70 |
| PDI | 2.4 | — | 2.7 | 2.4 | 2.3 |

Trial 3) shows that the Ru catalyst (6) from B8 catalyses the metathesis of NBR in an oxygen-saturated MCB solution at 23° C. even after storage of the catalyst solution at 40° C. for a period of 4 days. The degraded NBR obtained in trial 3) is gel-free.

What is claimed is
1. A process for the degradation of nitrile rubbers by metathesis, comprising subjecting the nitrile rubber to a metathesis reaction in the presence of a catalyst of the general formula (I),

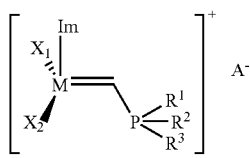

(I)

wherein
M is ruthenium or osmium,
$X^1$ and $X^2$ can be identical or different and are each anionic ligands,
$R^1$, $R^2$ and $R^3$ are identical or different and are each organic radicals, Im is a substituted or unsubstituted imidazolidine radical and
A is an anion.

2. The process according to claim 1, wherein a catalyst of the general formula (I) in which $X^1$ and $X^2$ are identical or different and are each hydrogen, halogen, pseudohalogen, $C_1$-$C_{20}$-alkyl, aryl, $C_1$-$C_{20}$-alkoxy, aryloxy, $C_3$-$C_{20}$-alkyldiketonate, aryldiketonate, $C_1$-$C_{20}$-carboxylate, arylsulphonate, $C_1$-$C_{20}$-alkylsulphonate, $C_1$-$C_{20}$-alkylthiol, arylthiol, $C_1$-$C_{20}$-alkylsulphonyl or $C_1$-$C_{20}$-alkylsulphinyl radical is used.

3. The process according to claim 1, wherein a catalyst of the general formula (I) in which the radicals $R^1$, $R^2$ and $R^3$ in the radical $P(R^1R^2R^3)$ of the general formula (I) are identical or different and are each straight-chain or branched $C_1$-$C_{30}$-alkyl, $C_5$-$C_{30}$-cycloalkyl or aryl, where the $C_1$-$C_{30}$-alkyl radicals may be interrupted by one or more double or triple bonds or else one or more heteroatoms.

4. The process according to claim 1, wherein a catalyst of the general formula (I) in which $P(R^1R^2R^3)$ in the general formula (I) is triphenylphosphine, tricyclohexylphosphine, tricyclopentylphosphine, triisopropylphosphine, tri(o-tolyl)phosphine, tri(o-xylyl)phosphine or trimesitylphosphine is used.

5. The process according to claim 1, wherein a catalyst in which the imidazolidine radical (Im) in the general formula (I) has a structure of the general formula (IIa) or (IIb),

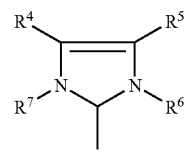

(IIa)

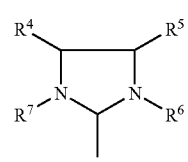

(IIb)

where
$R^4$, $R^5$, $R^6$, $R^7$ can be identical or different and are each hydrogen, straight-chain or branched, cyclic or acyclic $C_1$-$C_{20}$-alkyl, $C_2$-$C_{20}$-alkenyl, $C_2$-$C_{20}$-alkynyl, aryl, $C_1$-$C_{20}$-carboxylate, $C_1$-$C_{20}$-alkoxy, $C_2$-$C_{20}$-alkenyloxy, $C_2$-$C_{20}$-alkynyloxy, aryloxy, $C_2$-$C_{20}$-alkoxycarbonyl, $C_1$-$C_{20}$-alkylthio, arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl,
is used.

6. The process according to claim 1, wherein a catalyst of the general formula (I) in which the imidazolidine radical (Im) in the general formula (I) has a structure from the general formulae (IIIa-f)

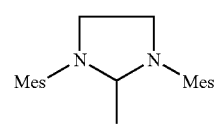

(IIIa)

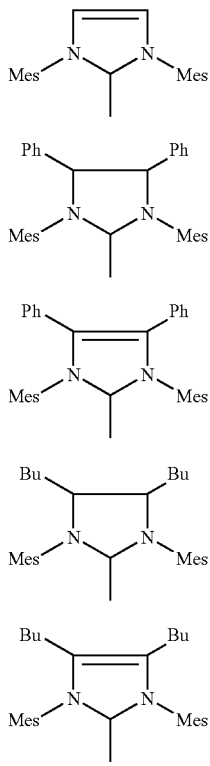

is used, wherein Mes is a mesityl group, Bu is a butyl group and Ph is a phenyl group.

7. The process according to claim 1, wherein a catalyst of the general formula (I) in which A in the general formula (I) is nitrate, nitrite, carbonate, sulphite, fluorosulphonate, trifluoromethanesulphonate (triflate), a halide, a pseudohalide, carboxylate, sulphonate, sulphate, phosphonate, phosphate, a complex anion or a noncoordinating anion is used.

8. The process according to claim 1, wherein a catalyst having one of the following structures (IVa-c)

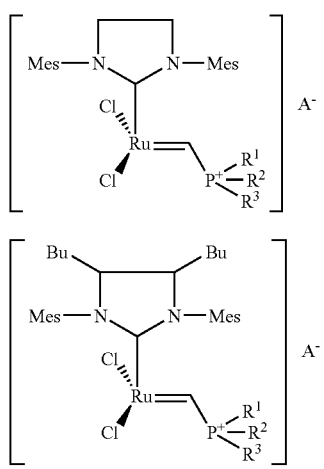

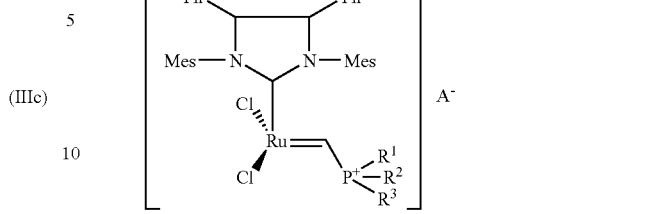

wherein

R$^1$, R$^2$, R3 are each straight-chain or branched C$_1$-C$_{30}$-alkyl, C$_5$-C$_{10}$-cycloalkyl or aryl, where the C$_1$-C$_{30}$-alkyl radicals may be interrupted by one or more double or triple bonds or else one or more heteroatoms, preferably oxygen or nitrogen, and A is as defined for the general formula (I), Mes is a mesityl group, Bu is a butyl group, and Ph is a phenyl group, is used.

9. The process according to claim 1, wherein a catalyst of the general formula (I) in which the radical P(R$^1$R$^2$R$^3$) is triisopropylphosphine, triphenylphosphine, tricyclohexylphosphine, tricyclopentylphosphine, tri(o-tolyl)phosphine, tri(o-xylyl)phosphine or trimesitylphosphine and A is bromide, versatate, sebacate, trifluoroacetate, nitrate, tetrafluoroborate, tetrakis(3,5-trifluoromethylphenyl)borate, tetrakis[pentafluoro-phenyl]borate or (bis(trispentafluorophenyl)boro)cyanide, is used.

10. The process according to claim 1, wherein the nitrile rubbers used for the metathesis have a Mooney viscosity (ML 1+4@100° C.) in the range from 30 to 70, and a polydispersity PDI=M$_w$/M$_n$, where M$_n$ is the number average molecular weight and M$_w$ is the weight average molecular weight, in the range 2.0-6.0.

11. A process for producing hydrogenated nitrile rubbers, comprising that the process according to claim 1 is followed by a hydrogenation of the nitrile rubber which has been degraded by the metathesis.

12. The process according to claim 3, wherein the heteroatom is selected from the group consisting of nitrogen and oxygen.

13. The process according to claim 10, wherein the nitrile rubbers used for the metathesis have a Mooney viscosity (ML 1+4@100° C.) in the range from 30 to 50.

14. The process according to claim 10, wherein the polydispersity PDI=M$_w$/M$_n$, where M$_n$ is the number average molecular weight and M$_w$ is the weight average molecular weight of the nitrile rubbers used is in the range 2.0 to 4.0.

* * * * *